United States Patent
Baker et al.

(10) Patent No.: US 11,145,000 B1
(45) Date of Patent: Oct. 12, 2021

(54) METHOD AND SYSTEM FOR DETECTING USE OF VEHICLE SAFETY SYSTEMS

(71) Applicant: UIPCO, LLC, San Antonio, TX (US)

(72) Inventors: Kelly Q. Baker, San Antonio, TX (US); Sumita T. Jonak, San Antonio, TX (US); Will Kerns Maney, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1 day.

(21) Appl. No.: 16/424,688

(22) Filed: May 29, 2019

Related U.S. Application Data

(60) Provisional application No. 62/753,119, filed on Oct. 31, 2018.

(51) Int. Cl.
| | |
|---|---|
| G06Q 40/08 | (2012.01) |
| B60W 40/09 | (2012.01) |
| B60W 50/16 | (2020.01) |
| G07C 5/00 | (2006.01) |
| G07C 5/08 | (2006.01) |

(52) U.S. Cl.
CPC ............ *G06Q 40/08* (2013.01); *B60W 40/09* (2013.01); *B60W 50/16* (2013.01); *G07C 5/008* (2013.01); *G07C 5/0808* (2013.01)

(58) Field of Classification Search
CPC ...... G06Q 40/08; B60W 40/09; B60W 50/16; G07C 5/008; G07C 5/0808
See application file for complete search history.

(56) References Cited

U.S. PATENT DOCUMENTS

| | | | | |
|---|---|---|---|---|
| 9,754,325 | B1* | 9/2017 | Konrardy | H04L 67/12 |
| 10,343,698 | B2* | 7/2019 | Poeppel | B60W 50/14 |
| 10,650,621 | B1* | 5/2020 | King | H04L 67/10 |
| 11,012,667 | B1* | 5/2021 | Nodder | G06K 9/00771 |
| 2004/0209594 | A1* | 10/2004 | Naboulsi | G06F 17/00 455/404.1 |
| 2005/0149242 | A1* | 7/2005 | Pavlish | B60R 21/01566 701/45 |
| 2007/0088488 | A1* | 4/2007 | Reeves | G07C 5/085 701/117 |
| 2016/0358453 | A1* | 12/2016 | Wassef | G08B 6/00 |
| 2018/0127001 | A1* | 5/2018 | Ricci | G08G 1/0125 |
| 2018/0174457 | A1* | 6/2018 | Taylor | G06K 9/00302 |
| 2020/0017117 | A1* | 1/2020 | Milton | B60W 50/02 |
| 2021/0134133 | A1* | 5/2021 | Fellows | G08G 1/052 |

FOREIGN PATENT DOCUMENTS

EP     3070700 B1 * 10/2017 ............ B60W 50/14

* cited by examiner

*Primary Examiner* — Scott C Anderson
*Assistant Examiner* — Matthew Cobb
(74) *Attorney, Agent, or Firm* — Plumsea Law Group, LLC

(57) ABSTRACT

A system and method for automatically detecting if a vehicle safety system is being used by a driver is disclosed. The system and method use data gathered from one or more sensors in the vehicle. The data is analyzed to determine if the safety system is being used or disabled. The system can send reminders to a driver to use the safety system. The system and method can also automatically update a policy holder's insurance policy to reflect whether or not a safety system is being used.

20 Claims, 7 Drawing Sheets

METHOD AND SYSTEM FOR DETECTING USE OF VEHICLE SAFETY SYSTEMS

CROSS-REFERENCE TO RELATED APPLICATIONS

This application claims the benefit of Provisional Patent Application No. 62/753,119 filed Oct. 31, 2018, and titled "Method and System for Detecting Use of Vehicle Safety Systems," which is incorporated by reference herein in its entirety.

TECHNICAL FIELD

The present disclosure generally relates to methods and systems for automatically detecting when vehicle safety systems are being used, and in particular to detecting when vehicle safety systems are being used by analyzing sensory information from the vehicle.

BACKGROUND

Vehicle owners are often required to have vehicle insurance in the event of damage or loss to the vehicle or its contents. To calculate a vehicle owner's insurance premium an insurance provider may consider a variety of factors. These can include the cost of the vehicle, the condition of the vehicle, the age of the vehicle and the driver's age.

An insurance provider may also consider whether or not a vehicle associated with an insurance policy has any safety systems. For example, many newer vehicles come with advanced safety systems including forward-collision warning systems and lane-departure warning systems. Because the use of these safety systems may help reduce the risk of an accident while driving, insurance provider's may offer insurance premium discounts for vehicles including such safety systems. However, some drivers find the safety system warnings annoying and prefer to switch them off. Providers do not have a way to confirm that the safety systems are being used.

There is a need in the art for a system and method that addresses the shortcomings discussed above.

SUMMARY

In one aspect, a method of determining if a vehicle safety system for a vehicle is enabled, where the vehicle is associated with an insurance policy, includes steps of retrieving sensory information from a sensor disposed in the vehicle, analyzing the sensory information to detect a vehicle safety system warning and determining if the vehicle safety system in enabled. The method also includes a step of sending a message to an owner of the insurance policy when the vehicle safety system has been disabled.

In another aspect, a method of determining if a vehicle safety system for a vehicle is enabled, where the vehicle is associated with an insurance policy, includes steps of retrieving sensory information from a first sensor disposed in the vehicle, analyzing the sensory information from the first sensor to determine a period of time when the vehicle safety system may have generated a safety system alert, and retrieving sensory information from a second sensor disposed in the vehicle, where at least some of the sensory information corresponds to the period of time. The method also includes steps of analyzing the sensory information from the second sensor to detect the safety system alert, determining if the vehicle safety system is enabled and sending a message to an owner of the insurance policy when the vehicle safety system has been disabled.

In another aspect, a method of determining if a vehicle safety system for a vehicle is being used, where the vehicle is associated with an insurance policy, includes steps of retrieving tracked data from an onboard diagnostic system disposed in the vehicle, the tracked data including information about use of the vehicle safety system, and retrieving a threshold frequency. The method also includes steps of determining if the vehicle safety system has been disabled more often than the threshold frequency and sending a message to an owner of the insurance policy.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide system and methods for automatically detecting whether a vehicle safety system in a vehicle is enabled or disabled by a driver. As used herein, the term "enabled" refers to a state of a vehicle safety system in which the vehicle safety system can issue alerts, warnings and/or actively control vehicle subsystems in response to sensed information. The term "disabled" refers to a state of a vehicle safety system where the vehicle safety system is prevented from issuing alerts, warnings and/or from actively controlling vehicle subsystems.

When the vehicle safety system is disabled too frequently, the system may automatically send a message to someone associated with the insurance policy for the vehicle. If the insurance policy already includes a discount for using the vehicle safety system, the message may include a reminder to enable the safety system to retain eligibility for the discount.

Vehicle safety system alerts can be detected by analyzing sensory information received from one or more sensors in the vehicle. The sensory information can be analyzed to detect known safety system alerts (including warnings), including known audible alerts, known visual alerts and known haptic alerts. By automatically detecting if a vehicle safety system is enabled or disabled, the system and method can help an insurance provider save costs by ensuring discounts are only given to customers who are using the vehicle safety systems.

Figure 1:
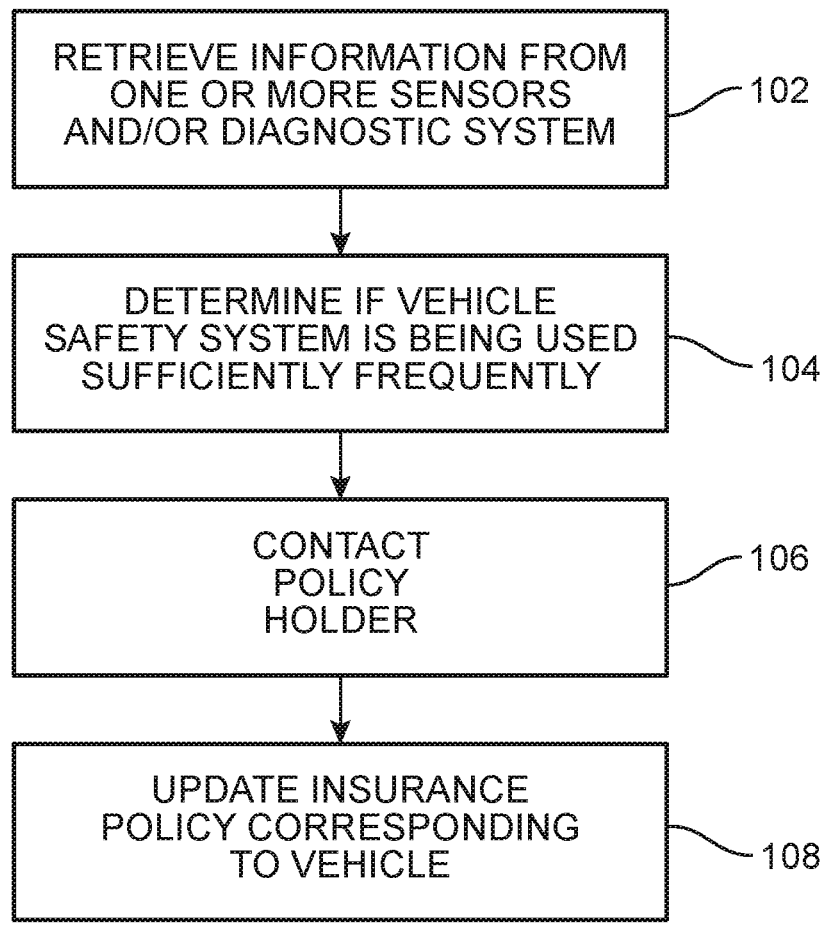
FIG. 1 is a schematic view of a process for detecting if a safety system in a vehicle is being used or disabled, according to an embodiment.

FIG. 1 is a schematic view of a process for detecting if a vehicle safety system is being enabled or disabled, sending messages to a policy holder, and optionally updating an insurance policy associated with the vehicle, according to an embodiment. In the present embodiment, one or more of the steps in this process may be performed by an insurance provider. The term "insurance provider" (or simply "provider"), as used herein refers to any institutions or companies that provide insurance products. Insurance products can include home owner's insurance, renter's insurance, commercial property insurance, and vehicle insurance. An insurance product may be characterized by an insurance policy, which is a contract between an insurance provider (the insurer) and a policy holder (the "insured"). In cases where vehicle insurance is provided, the policy holder may be an owner, or driver, of a vehicle. The policy holder may also be referred to as a customer of the insurance provider.

In step 102, a provider may retrieve information from one or more sensors and/or from a diagnostic system. As discussed in further detail below, the sensors could be associated with a vehicle, or with a user device disposed within the vehicle. The type of sensors could vary, and may generally include optical based sensors (for example, cameras), audible based sensors, haptic or motion based sensors, gyroscopes, accelerometers, wheel speed sensors, as well as other suitable sensors. Information could be retrieved directly from the sensors, or may be retrieved through the vehicle's onboard diagnostics system (OBD), which may monitor some, or all, of a vehicle's onboard sensors.

In some embodiments, during step 102, the computing system may also retrieve any other kind of tracked information from the onboard diagnostics system, including non-sensed information. For example, if the onboard diagnostics system is in communication with a vehicle safety system and tracks its state over time (including "enabled" or "disabled" states), the computing system could retrieve this tracked information.

Next, in step 104, the information from the one or more sensors may be used to determine if a vehicle safety system is being used. More specifically, this step may include determining if the vehicle safety system is being used sufficiently frequently (or disabled too frequently). As used herein, a vehicle safety system is used sufficiently frequently if it is not disabled more often than a threshold frequency. The threshold frequency could be selected by the provider and could take values such as once a week, once a month or once a year. An insurance provider may not provide discounts to drivers who disable vehicle safety systems more often than the threshold frequency.

In other embodiments, rather than monitoring the frequency of use, a provider could monitor the total elapsed time that a safety system is enabled or not enabled (while driving). In some embodiments, the provider could determine that a safety system is not being used sufficiently frequently if the total elapsed time that the system is disabled (while driven) is greater than some threshold percentage/ratio. For example, the threshold ratio could be 10%. That is, the threshold ratio of the total elapsed time that the safety system is disabled to the total time the vehicle has been driven in a given period is 10%.

Depending on how frequently the safety system is being used, in step 106, the provider may contact the policy holder. For example, a policy holder who is already receiving a discount on their insurance premium for having a vehicle safety system may receive reminders when the provider determines that the vehicle safety system is disabled too frequently. That is, when the vehicle safety system is not being enabled sufficiently frequently. As another example, a policy holder who is not already receiving discounts may receive information about insurance premium discounts when the insurance provider detects that the safety system is not disabled too frequently. That is, when the vehicle safety system is being enabled sufficiently frequently.

In an optional step 108, the provider may update an insurance policy corresponding to the vehicle. In some cases, the provider could automatically remove discounts for having a vehicle safety system when the vehicle safety system is disabled too frequently (that is, when the vehicle safety system is not enabled sufficiently frequently). In other cases, the provider could automatically add discounts for regular use of a vehicle safety system for policy holders who not already receiving such a discount.

Figure 2:
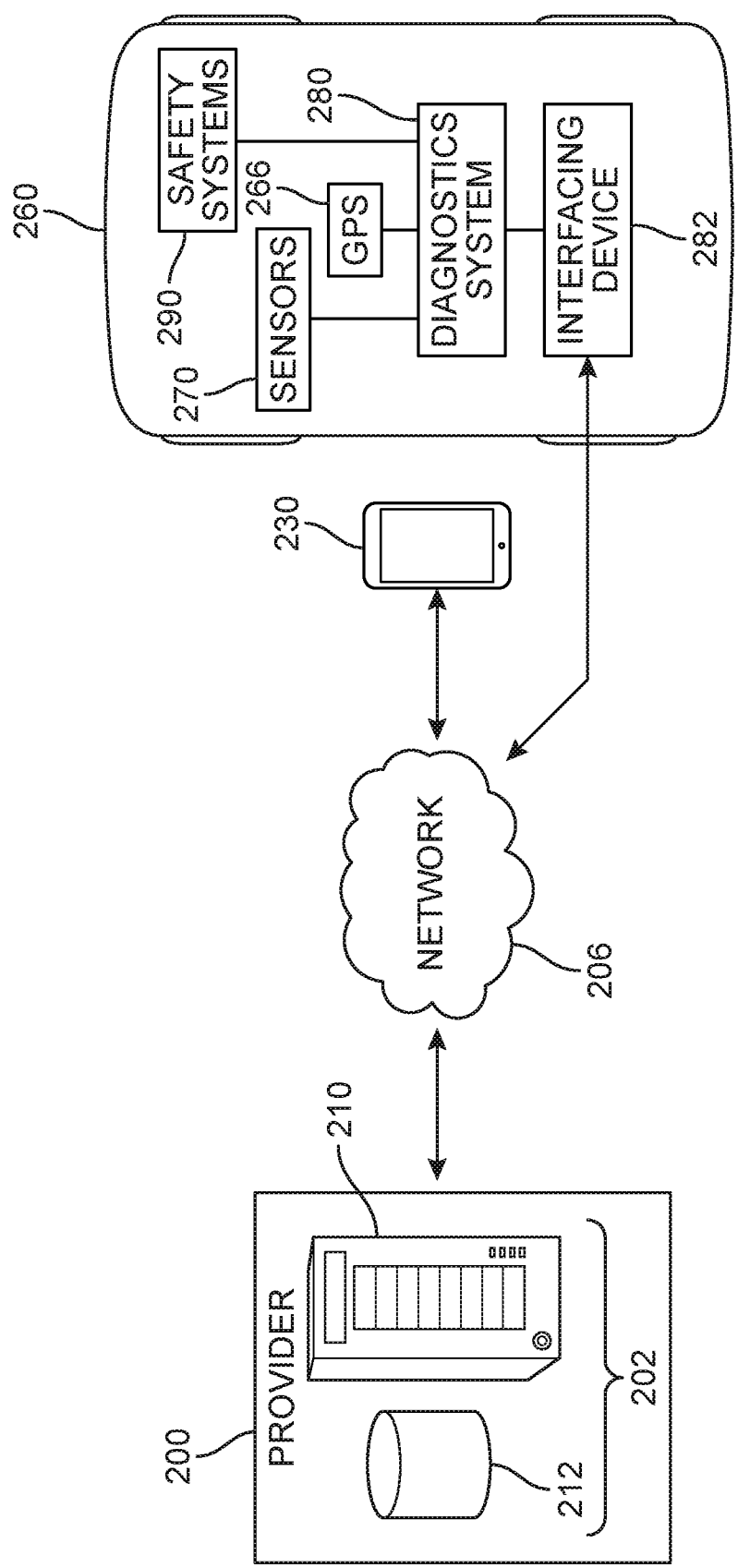
FIG. 2 is a schematic view of a system for receiving sensed information and analyzing the information to detect vehicle safety system use.

FIG. 2 is a schematic view of many of the systems and devices that may be used to extract and process sensory data from a vehicle or other device. Referring to FIG. 2, provider 200 may comprise a centralized computing system 202. The term "computing system" refers to the computing resources of a single computer, the partial computing resources of a single computer, a plurality of computers communicating with one another, or a network of remote servers. In an exemplary embodiment, computing system 202 includes at least one server.

In the embodiment of FIG. 2, centralized computing system 202 comprises one or more computing devices 210 (for example, a server) that may be in communication with one or more databases 212. Computing device 210 may include one or more processors and a non-transitory computer readable medium. Instructions stored on the non-transitory computer readable medium may be executed by the one or more processors. Databases 212 could be co-located with computing device 210 or could be remote databases that are accessible by computing device 210 over network 206. Databases 212 can include any kind of storage devices, including but not limited magnetic, optical, magneto-optical, and/or memory, including volatile memory and non-volatile memory.

In some embodiments, information from a plurality of sensors 270 disposed in or on a vehicle may be accessible through a diagnostics system 280 of vehicle 260. Diagnostics system 280 may be associated with on-board diagnostics (OBD) capabilities. In some cases, diagnostics system 280 may comprise part of an onboard computing system of vehicle 260.

To access diagnostics system 280, some embodiments may include an interfacing device 282. Interfacing device 282 may include any device that can interface with diagnostics system 280 and also communicate with computing device 202 over a network, or wired connection. Interfacing device 282 could communicate with diagnostics system 280 using various interfacing protocols and hardware. Exemplary interfaces include OBD-I, OBD-1.5, and OBD-II. Interfacing devices can comprise hand-held scan tools, mobile device-based tools, PC-based scan tools, data loggers and telematics devices.

In one embodiment, interfacing device 282 is a telematics device. The term "telematics device" refers to any device that can plugged into an interfacing port (for example, an OBD-II port) on a vehicle and used to track information from sensors and/or other onboard systems. In some embodiments, a telematics device may be configured to wirelessly communicate with other computing devices. In other embodiments, a telematics device may track and store information that can be accessed at a later time by removing the device and plugging it into another computing device (for example, using a USB cord).

In some embodiments, location information for a vehicle can also be retrieved using interfacing device 282. In the example of FIG. 2, vehicle 260 includes an onboard GPS receiver 266 that can receive GPS information. This information can be accessed by interfacing device 282 via diagnostics system 280. In other embodiments, GPS information, or any other location or navigation information, can be retrieved from any other suitable devices in a vehicle.

Information about one or more vehicle safety systems 290 could be retrieved using interfacing device 282. In some embodiments, diagnostics system 280 may receive information from one or more safety systems and this information could be available to a provider through interfacing device 282.

Provider 200 can retrieve various kinds of real time or tracked sensory information associated with vehicle 260 via communication with interfacing device 282. In some embodiments, this communication occurs over network 206. In other embodiments, interfacing device 282 could be a removable telematics device that can be unplugged from diagnostics system 280 and physically plugged into a device associated with computing system 202.

Provider 200 could also communicate with a user device 230, which may be carried in, or adjacent to, vehicle 260. User device 230 may comprise a computing system for processing and communicating information. A user device may generally include a processor, a data storage component, and a display. A user device may also include components to facilitate communication with external systems (for example, hardware and software components to enable communication over network 206). In some cases, a user device includes one or more physical buttons. In some cases, a user device includes touchscreen controls. Additionally, user device 230 could include additional sensors including, but not limited to: accelerometers, gyroscopes, magnetometers, GPS receivers, barometers, proximity sensors and ambient light sensors.

In the exemplary embodiment of FIG. 2, user device 230 comprises a mobile device. Specifically, user device 230 comprises smartphone. In other embodiments, user device 230 could be a tablet computing device. In still other embodiments, however, a user device could comprise a laptop, a desktop computer, or similar kind of device.

Any of the devices described above may be configured to operate in a client-server relationship with computing system 202 of provider 200. For example, computing system 202 may include a server that communicates with interfacing device 282 over network 206. Computing system 202 could also communicate with sensors or local computing devices that are themselves connected to sensors. Information from these various devices may be sent to computing system 202 for analysis and/or storing data.

In some embodiments, user device 230 may run client software to control one or more sensors of the device, retrieve sensory information, store sensory information and/or send sensory information to computing system 202 for analysis. In addition, messages may be automatically sent to user device 230 to inform a user of changes to their policy and/or to request further action regarding their policy.

Figure 3:
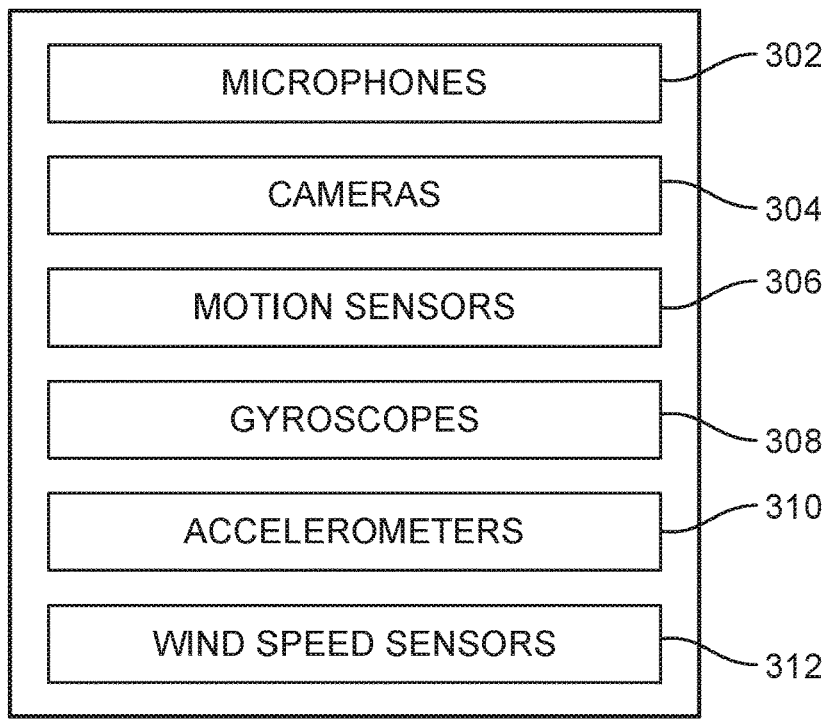
FIG. 3 is a schematic view of various sensors that could be used with the exemplary system of FIG. 2.

FIG. 3 is a schematic view of various kinds of sensors that could be associated with either vehicle 260 or user device 230. It may be appreciated that different sensors can be used with each device and a single device need not include all of the following sensors.

Figure 5:
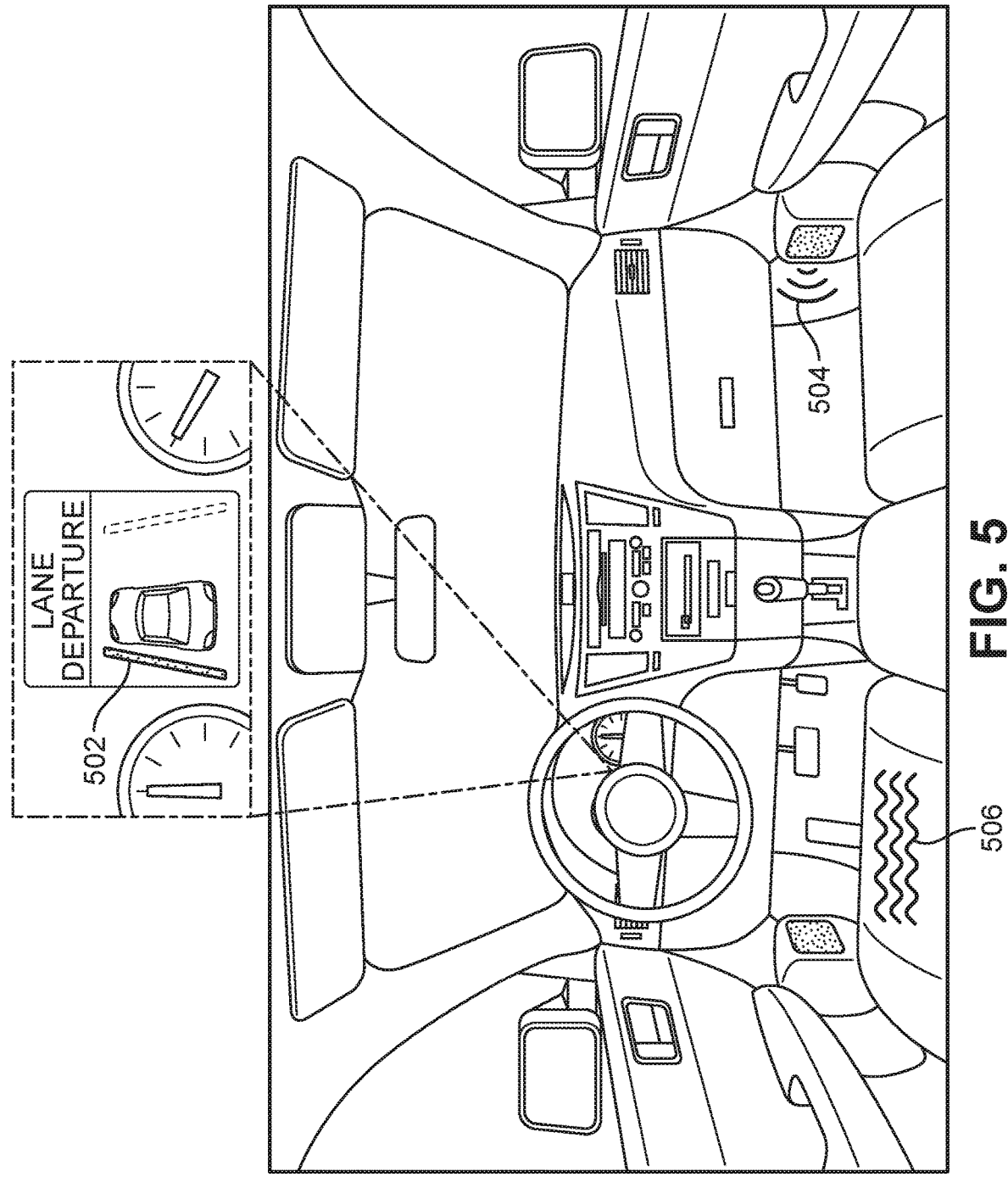
FIG. 5 is a schematic view of a configuration where a lane departure warning system provides visual alerts, audible alerts and haptic alerts to a driver, according to an embodiment.

Exemplary sensors include sensors for detecting safety system warnings. Referring to FIG. 5, vehicle safety systems may provide alerts. These alerts can include warnings, such as visual warnings, audible warnings and/or haptic warnings. As an example, referring to FIG. 5, visual warnings 502 may be displayed on a dashboard, audible warnings 504 may be played through vehicle speakers and haptic warnings 506 could be provided as vibrations of the driver's seat. Therefore, sensors may be provided for detecting each kind of warning. These include microphones 302, cameras 304 and motion sensors 306.

Microphones 302 could include any kind of microphones known in the art for use in vehicles or mobile devices. User device 230 may include microphones. In addition, vehicle 260 could include microphones embedded in a dashboard, in a rearview mirror or other locations. Microphones in a vehicle may be useful for speakerphone functionality and for communicating audibly with an onboard intelligent voice assistant. In some embodiments, microphones 302 could be used to detect audible alerts from a vehicle safety system.

Cameras 304 could include any kind of cameras known in the art for use in vehicles or mobile devices. User device 230 may include one or more cameras. In addition, vehicle 260 could include cameras in a dashboard or rearview mirror, for example. In some embodiments, cameras 304 could be used to detect visual alerts from a vehicle safety system.

Motion sensors 312 could comprise any kinds of motions sensors known in the art. These may include, but are not limited to: passive infrared sensors, microwave sensors, and ultrasonic sensors. Motion sensors could be deployed at selective locations in a vehicle. In some embodiments, one or more motion sensors 312 may be disposed in or near a driver's seat, where haptic feedback may be provided. Sensors could also be disposed on a steering wheel or headrest, where haptic feedback may also be provided. In some embodiments, motion sensors 312 could be used to detect haptic alerts from a vehicle safety system.

Other sensors can include sensors for detecting driving conditions. To determine if a driver is enabling or disabling a safety system, it may be necessary to assess when safety system warnings are expected. Therefore, a provider may analyze driving condition data to look for periods of time when a vehicle safety system would be expected to generate an alert. Driving conditions can be inferred from sensory information retrieved from gyroscopes 308, accelerometers 310 and wheel speed sensors 312, as well as possibly from other sensors. These sensors may already be used by the onboard computer of the vehicle to assess driving conditions and determine when a vehicle safety system warning should be activated.

Figure 4:
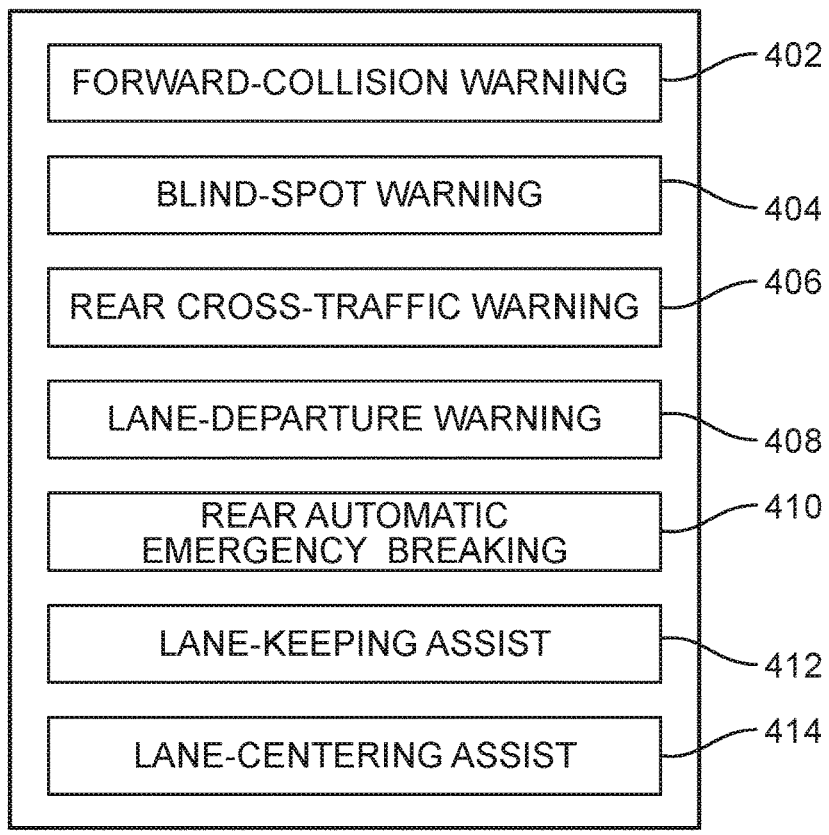
FIG. 4 is a schematic view of a various vehicle safety systems for a vehicle, according to an embodiment.

FIG. 4 is a schematic view of a plurality of vehicle safety systems that could be incorporated into a vehicle. It may be appreciated that different embodiments could incorporate a different combinations of safety systems. Some embodiments, for example, could include only a single safety system.

Referring to FIG. 4, safety systems 290 may include various warning systems such as a forward-collision warning system 402, a blind-spot warning system 404, a rear cross-traffic warning system 406, and a lane departure warning system 408. These warning systems may help drivers to avoid dangerous situations such as potential collisions or a vehicle unintentionally departing from its lane. To notify a driver of potential dangers, these systems may use one or more alerts, including visual, audible and haptic alerts.

In addition, safety systems 290 could also include various safety assistance systems, such as a rear automatic emergency breaking system 410, lane-keeping assist system 412 and a lane-centering assist system 414. In some cases, assistance systems may provide alerts to a driver. These alerts may indicate to the driver that the vehicle safety system is actively controlling the vehicle. These assistance alerts may be detected in a similar manner to the alerts of the warning systems described above.

Other vehicle systems may also be detected, including daytime running lights and RADAR/LIDAR detection. Using daytime running lights may help reduce the risk of accidents, especially in foggy and rainy conditions, so a provider may want to know that a driver is keeping the daytime running lights engaged. A provider may also want to know if a driver is using RADAR and/or LIDAR, since this may indicate that the driver is concerned about speeding. In some embodiments, the status of daytime running lights (that is, ON or OFF), may be tracked by, and retrieved from, the onboard diagnostics system. In some embodiments, the use of RADAR could be detected by monitoring select radio frequencies using a mobile device.

Still other vehicle systems could also be monitored. For example, in one embodiment, a provider could monitor the vehicle's driving mode. Exemplary driving modes offered by some manufacturers include "normal," "comfort," "sports," and "super/turbo". A provider may detect how often (or for how long) a vehicle is operated in super/turbo mode, since this mode may be associated with higher possible accelerations of the vehicle.

In some embodiments, a provider could monitor other kinds of vehicle diagnostic information. For example, some embodiments could detect tire pressure, or an alert from a low tire pressure warning system. Based on whether the tire pressure is low, normal or high, the provider could adjust insurance premiums accordingly.

Figure 6:
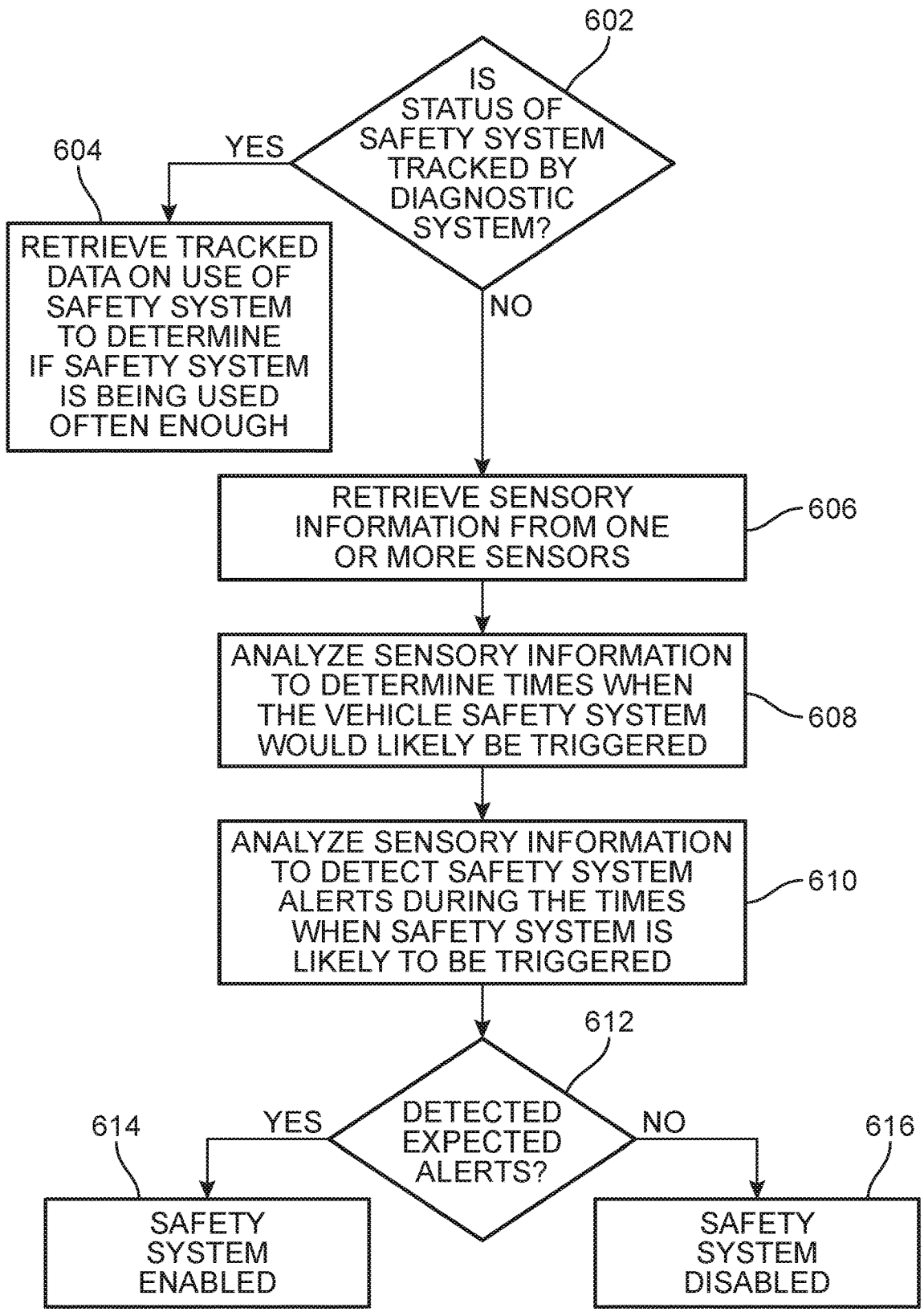
FIG. 6 is a schematic view of a process for determining if a safety system is being used or disabled, according to an embodiment.

FIG. 6 is a schematic process for automatically detecting if a safety system is being used sufficiently frequently. For convenience, the following steps are described as being performed by a computing system operated by provider (e.g., provider 200 in FIG. 2). However, it may be appreciated that some of these steps can be performed by one or more systems operated by another entity. In one embodiment, the following steps can be performed by software running on a computing system (e.g., computing system 202) that is maintained by a provider (e.g., provider 200).

In step 602, a computing system may determine if the state of a safety system is tracked by a diagnostic system or other system of the vehicle. Specifically, the computing system determines if information is available indicating when the safety system is enabled and when the safety system is disabled. The availability of tracked safety system state data may depend on the vehicle, the manufacturer, the type of diagnostic system used and the type of interfacing device used.

If the safety system state is tracked by the diagnostic system, the computing system may proceed to step 604. At step 604, the computing system retrieves tracked data on the safety system state to determine if the system is being used often enough. More specifically, the computing system may analyze trends in the safety system state over time to determine if the safety system is disabled more often than a threshold frequency that may be set by the provider.

If the safety system status data is not available from the diagnostic system, the computing system may proceed to step 606. At step 606, the computing system may retrieve sensory information from one or more sensors of the vehicle, or sensors of another device located in the vehicle (such as user device 230).

Next, in step 608, the computing system may analyze the sensory information to determine times when the vehicle safety system is likely to be triggered and issue an alert. In some cases, the computing system can analyze information from gyroscopes 308, accelerometers 310 and wheel speed sensors 312, to find times when a vehicle safety system may have issued an alert. For example, the computing system may analyze information from accelerometers 310 to detect a time when a vehicle decelerated very quickly, indicating that a driver may have received a collision warning. If the safety system was enabled during this time, forward-collision warning system 402 may have issued a warning.

Once the computing system has identified times when its likely one or more safety systems would have issued alerts, the computing system may proceed to step 610. At step 610, the computing system may analyze sensory information to detect safety system alerts. More specifically, the computing system may analyze sensory information corresponding to times when one or more vehicle safety systems would be expected to issue an alert, as determined in step 608.

In step 612, the computing system determines if alerts are detected at the times when the vehicle safety system is expected to issue alerts. If so, the computing system determines that the safety system is enabled at step 614. If not, the computing system determines that the safety system is disabled at step 616.

It may be appreciated that sensory information such as acceleration information may only serve as a proxy for situations where one or more safety systems would trigger an alert. Therefore, in some embodiments, a computing system may analyze data from multiple different sensors to determine when vehicle safety systems would likely be triggered.

The process depicted in FIG. 6 describes a method for a single safety system. However, it may be appreciated that the process of FIG. 6 could apply to any of the safety systems described above and shown schematically in FIG. 4.

Figure 7:
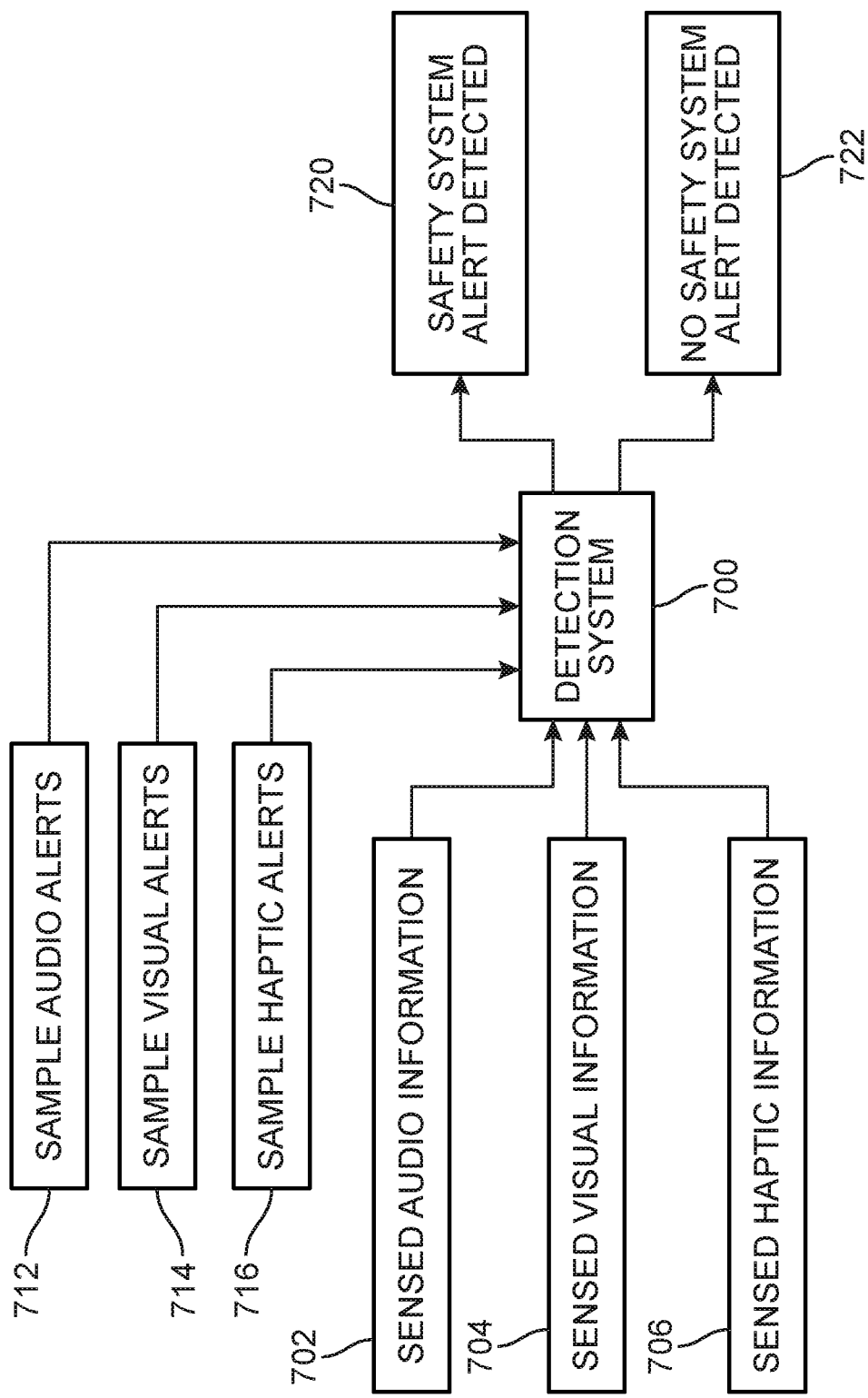
FIG. 7 is a schematic view of a detection system for detecting safety system alerts, according to an embodiment.

FIG. 7 is a schematic view of a detection system for determining if a safety system alert has been detected from sensory data. Detection system 700 could be any algorithm, process or software system for analyzing sensory data and detecting safety system alerts. In some embodiments, detection system 700 could be a machine learning system.

Referring to FIG. 7, sensed information is provided as input. This sensed information may take the form of sensed audio information 702, sensed visual information 704 and sensed haptic information 706. In some cases, this information may be retrieved from microphones, cameras and/or motions sensors in the vehicle and/or from sensors associated with a user device (for example, user device 230).

Detection system 700 may compare sensed information with sample alerts. In particular, detection system 700 could include sample audible alerts 712, sample visual alerts 714 and sample haptic alerts 716. In embodiments where detection system 700 is a machine learning system, the sample alerts could comprise training data that detection system 700 is trained on prior to being used in a deployed environment.

Detection system 700 may include a first output 720 and a second output 722. The first output 720 indicates that a safety system alert has been detected. The second output 722 indicates that no safety system alert has been detected. In other embodiments, output from detection system 700 could also include the type of alert detected, such as "visual alert detected", "audible alert detected" or "haptic alert detected".

It may be appreciated that in embodiments with multiple safety systems, a detection system could be configured to detect different alerts associated with each safety system. Moreover, in some cases, the output of the detection system could indicate which safety system was detected.

Figure 8:
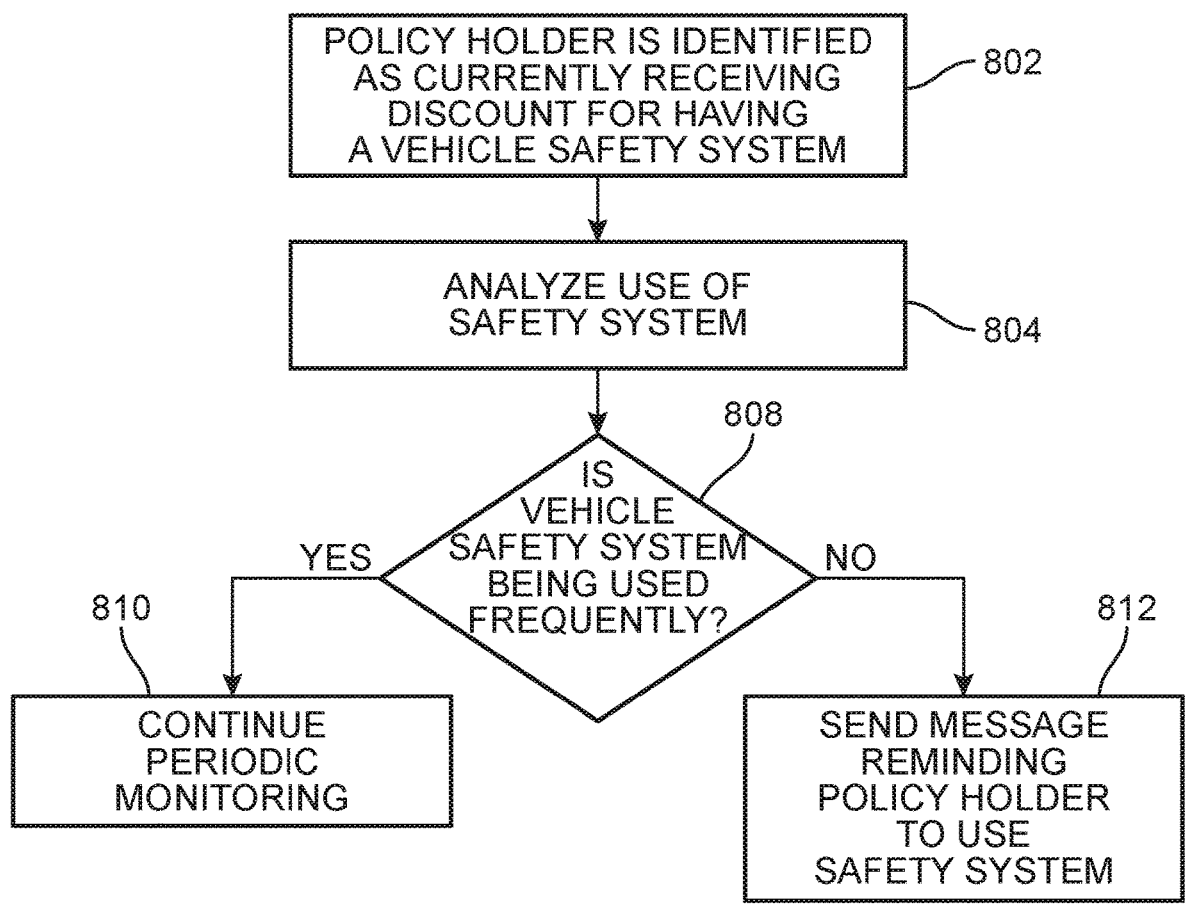
FIG. 8 is a schematic view of a process for sending reminder messages to a policy holder, according to an embodiment.

FIG. 8 is a schematic view of a process for sending messages to a policy holder when the computing system determines that a vehicle safety system is not enabled sufficiently frequently (or, equivalently, that it is disabled too often). In step 802, a computing system identifies a policy holder as already receiving a discount for having a vehicle safety system. Next, in step 804 the computing system may analyze the use of the safety system according to the methods described above.

In step 808, the computing system determines if the vehicle safety system is enabled sufficiently frequently. If the vehicle safety system is enabled sufficiently frequently, the computing system may proceed to step 810. At step 810, the computing system can continue periodic monitoring to ensure the vehicle safety system continues to be used frequently.

If the vehicle safety system is not used sufficiently frequently, the computing system may proceed to step 812. At step 812, the computing system may send a message to the policy holder. This message can include a reminder to use the vehicle safety system to maintain the current discount on their insurance policy. That is, the current discount on the premium or the deductible. If the safety system remains on unless a driver manually deactivates it, the message could be rephrased to ask the driver to stop disabling the vehicle safety system. This message could be provided via text, email or even a call placed by a representative. In some embodiments, the message could be pushed to a mobile device through an application supported by the insurance provider. In still other embodiments, the message could be provided on a display screen in a vehicle prior to when the vehicle is first turned on, but before the vehicle is placed in drive or reverse.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for detecting use of a vehicle safety system in a vehicle, the method comprising:
　at a computing device comprising one or more processors, a non-transitory computer readable medium, and instructions stored in the non-transitory computer readable medium which are executable by the one or more processors for:
　　receiving, at the computing device, at least one of sensed audio information retrieved from a microphone located inside the vehicle, sensed visual information retrieved from a camera located inside the vehicle, or sensed haptic information from a motion sensor located inside the vehicle;
　　wherein the sensed audio information from the microphone is an audible alert issued from the vehicle safety system, the sensed image information is a visual alert issued from the vehicle safety system, and the sensed haptic information is a haptic alert issued from the vehicle safety system;
　　comparing the received at least one of the sensed audio information, the sensed image information, or the sensed haptic information to sample alerts for the vehicle safety system to detect whether an alert has been issued by the vehicle safety system, wherein the sample alerts include one or more of a sample audible alert, a sample visual alert, or a sample haptic alert associated with the vehicle safety system;
　　determining if the vehicle safety system is enabled or disabled based on the comparison between the received at least one of the sensed audio information, the sensed image information, or the sensed haptic information to the sample alerts for the vehicle safety system; and
　　upon determining that the vehicle safety system is disabled, sending a message to a display screen inside the vehicle, wherein the message includes a reminder to use the vehicle safety system.

2. The method according to claim 1, wherein the message is displayed on the display screen inside the vehicle when the vehicle is first turned on, but prior to the vehicle being placed into drive or reverse.

3. The method according to claim 1, wherein the received at least one of the sensed audio information, the sensed image information, or the sensed haptic information is received by the computing device from a telematics device connected to a diagnostics system of the vehicle.

4. The method according to claim 1, further comprising:
　at the computing device,
　　determining a period of time over which the vehicle safety system is expected to have issued an alert,
　　wherein determining that the vehicle safety system is disabled is based on detecting that the alert from the vehicle safety system has not been issued over the period of time.

5. The method according to claim 4, wherein determining that the alert is expected to have been issued by the vehicle safety system over the period of time includes analyzing driving condition data associated with the vehicle from one or more of a gyroscope, accelerometers, or wheel speed sensors; and
　determining, based on the analyzed driving condition data, that at least one alert should have been issued from the vehicle safety system during the period of time.

6. The method according to claim 1, further comprising:
　upon determining that the vehicle safety system is disabled, automatically modifying an insurance policy associated with the vehicle.

7. The method according to claim 1, wherein the received at least one of the sensed audio information, the sensed image information, or the sensed haptic information is received by the computing device from a mobile device carried in the vehicle.

8. The method according to claim 1, comprising:
　at the computing device,
　　monitoring a total elapsed time that the vehicle safety system is disabled while the vehicle is driven during a predetermined period;
　　retrieving a total time driven for the vehicle during the predetermined period; and
　　sending the message to the display screen based on identifying that a ratio of the total elapsed time to the total time driven is greater than a threshold ratio.

9. A method for detecting use of a vehicle safety system in a vehicle, the method comprising:
　at a computing device comprising one or more processors, a non-transitory computer readable medium, and instructions stored in the non-transitory computer readable medium which are executable by the one or more processors for:
　　receiving, at the computing device, sensed driving condition information retrieved from one or more vehicle sensors onboard the vehicle;
　　analyzing the sensed driving condition information from the one or more vehicle sensors onboard the vehicle to determine a period of time over which the vehicle safety system is expected to have issued a safety system alert at a sensory output of the vehicle safety system, wherein the safety system alert is one of an audible alert, a visual alert, or a haptic alert;
　　receiving, at the computing device, at least one of sensed audio information retrieved from a microphone located inside the vehicle, sensed visual information retrieved from a camera located inside the vehicle, or sensed haptic information from a motion sensor located inside the vehicle;

analyzing the at least one of sensed audio information retrieved from the microphone located inside the vehicle, the sensed visual information retrieved from the camera located inside the vehicle, or the sensed haptic information from the motion sensor located inside the vehicle to detect whether the safety system alert has been issued at the sensory output during the period of time;

comparing the received at least one of the sensed audio information, the sensed visual information retrieved, or the sensed haptic information to sample alerts for the vehicle safety system to detect whether the vehicle safety system alert has been issued at the sensory output during the period of time, wherein the sample alerts include one or more of a sample audible alert, a sample visual alert, or a sample haptic alert associated with the vehicle safety system determining if the vehicle safety system is enabled or disabled based on the comparison between the received at least one of the sensed audio information, the sensed image information, or the sensed haptic information to the sample alerts for the vehicle safety system; and upon determining that the vehicle safety system is disabled, sending a message to a display screen inside the vehicle, wherein the message includes a reminder to use the vehicle safety system.

10. The method according to claim 9, wherein the one or more vehicle sensors onboard the vehicle includes a gyroscope.

11. The method according to claim 9, wherein the one or more vehicle sensors onboard the vehicle includes an accelerometer.

12. The method according to claim 9, wherein the one or more vehicle sensors onboard the vehicle includes a wheel speed sensor.

13. The method according to claim 9, further comprising: upon determining that the vehicle safety system is disabled, automatically modifying an insurance policy associated with the vehicle.

14. The method according to claim 9, wherein the received at least one of the sensed audio information, the sensed image information, or the sensed haptic information is received by the computing device from a telematics device connected to a diagnostics system of the vehicle.

15. The method according to claim 9, wherein the received at least one of the sensed audio information, the sensed image information, or the sensed haptic information is received by the computing device from a mobile device carried in the vehicle.

16. The method according to claim 13, wherein automatically modifying the insurance policy includes adjusting an insurance premium for the insurance policy associated with the vehicle.

17. A method for detecting use of a vehicle safety system in a vehicle, the method comprising:

at a computing device comprising one or more processors, a non-transitory computer readable medium, and instructions stored in the non-transitory computer readable medium which are executable by the one or more processors for:

retrieving tracked data from an onboard diagnostic system disposed in the vehicle, the tracked data including information about a state of the vehicle safety system in the vehicle over a time period, wherein the information about the state of the vehicle safety system includes information indicating when the vehicle safety system is enabled during the time period and information indicating when the vehicle safety system is disabled during the time period;

based on the retrieved tracked data, determining a total number of times that the vehicle safety system has been disabled over the time period;

retrieving a threshold frequency indicating a number of times that the vehicle safety system may be disabled over the time period;

comparing the total number of times that the vehicle safety system has been disabled over the time period to the threshold frequency;

determining, based on the comparison, whether the vehicle safety system has been disabled more often than the threshold frequency over the time period; and upon determining that the vehicle system has been disabled more often than the threshold frequency over the time period, sending a message to a display screen inside the vehicle, wherein the message includes a reminder to use the vehicle safety system.

18. The method according to claim 17, wherein the message is displayed on the display screen inside the vehicle when the vehicle is first turned on, but prior to the vehicle being placed into drive or reverse.

19. The method according to claim 17, wherein retrieving the tracked data comprises:

receiving, at the computing device, a communication of the tracked data via a network from a telematics device connected to the onboard diagnostics system, or from a removable telematics device configured to connect to and removably disconnect from the onboard diagnostics system.

20. The method according to claim 17, wherein the method further includes, based on determining that the vehicle system has been disabled more often than the threshold frequency over the time period, a step of automatically adjusting an insurance premium for an insurance policy associated with the vehicle.

* * * * *